(12) United States Patent
Feng et al.

(10) Patent No.: US 8,499,146 B2
(45) Date of Patent: Jul. 30, 2013

(54) METHOD AND DEVICE FOR PREVENTING NETWORK ATTACKS

(75) Inventors: Hongyan Feng, Chengdu (CN); Lifeng Liu, Chengdu (CN)

(73) Assignee: Chengdu Huawei Symantec Technologies Co., Ltd., Chengdu (CN)

( * ) Notice: Subject to any disclaimer, the term of this patent is extended or adjusted under 35 U.S.C. 154(b) by 182 days.

(21) Appl. No.: 13/097,676

(22) Filed: Apr. 29, 2011

(65) Prior Publication Data

US 2011/0264908 A1 Oct. 27, 2011

Related U.S. Application Data (63) Continuation of application No. PCT/CN2009/074578, filed on Oct. 23, 2009.

(30) Foreign Application Priority Data

Oct. 31, 2008 (CN) .......................... 2008 1 0174681

(51) Int. Cl.
*H04L 29/06* (2006.01)
(52) U.S. Cl.
CPC ............ *H04L 63/0428* (2013.01); *H04L 29/06* (2013.01)
USPC .......................................... 713/153; 713/150
(58) Field of Classification Search
USPC .................... 713/153, 168, 150, 166, 176
See application file for complete search history.

(56) References Cited

U.S. PATENT DOCUMENTS

| 2002/0152384 A1* | 10/2002 | Shelest et al. ................. 713/176 |
| 2006/0048228 A1* | 3/2006 | Takemori et al. ............... 726/22 |
| 2006/0077908 A1* | 4/2006 | Park et al. ..................... 370/254 |
| 2006/0248230 A1 | 11/2006 | Kempf et al. |

(Continued)

FOREIGN PATENT DOCUMENTS

| CN | 101106568 A | 1/2008 |
| CN | 101162999 A | 4/2008 |

(Continued)

OTHER PUBLICATIONS

Al Sa'deh et al. "CS-CGA: Compact and more Secure CGA," 2011 IEEE, pp. 1-6.*

(Continued)

*Primary Examiner* — Luu Pham
*Assistant Examiner* — Nelson Giddins
(74) *Attorney, Agent, or Firm* — Leydig, Voit & Mayer, Ltd.

(57) ABSTRACT

A method for preventing network attacks is provided, which includes: obtaining a data packet, where a source address of the data packet is a cryptographically generated address (CGA); determining that the obtained data packet includes a CGA parameter and signature information; authenticating the CGA parameter; authenticating the signature information according to the authenticated CGA parameter; and sending the data packet to a destination address when the signature information is authenticated. Accordingly, a device for preventing network attacks is also provided. A CGA parameter used by a data packet is directly used to ensure authenticity of a source address of the data packet, thus preventing network attacks performed by counterfeiting the address. In addition, by authenticating signature information, authenticity of identification of a sender of the data packet and bound address of the sender of the data packet are further ensured. Therefore, illegal data packets are filtered to prevent network attacks on servers, thus improving network security.

5 Claims, 5 Drawing Sheets

U.S. PATENT DOCUMENTS

2008/0137659 A1  6/2008  Levy-Abegnoli et al.
2008/0263353 A1* 10/2008  Droms et al. .................. 713/153
2009/0119407 A1*  5/2009  Krishnan ....................... 709/228

FOREIGN PATENT DOCUMENTS

| CN | 101404579 A | 4/2009 |
| --- | --- | --- |
| CN | 101404579 B | 2/2011 |
| WO | WO 2009/012676 A1 | 1/2009 |

OTHER PUBLICATIONS

Guang Yao, et al., "A CGA based IP source address authentication method in IPv6 access network," 2008 IEEE, pp. 534-535.*

Yong Feng, et al., "A Novel Authentication Mechanism Based on CGA for BU Message Disposal in Mobile IPv6," 2008 IEEE, pp. 137-143.*

Aura, "RFC—3972—Cryptographically Generated Addresses (CGA)," Mar. 2005, The Internet Society, Reston, Virginia.

1st Office Action in corresponding Chinese Application No. 200810174681.8 (May 12, 2010).

Written Opinion of the International Searching Authority in corresponding PCT Application No. PCT/CN2009/074575 (Jan. 28, 2010).

Extended European Search Report in corresponding European Application No. 09823057.6 (Feb. 21, 2012).

Arkko et al., "Secure Neighbor Discovery (SEND)," Network Working Group, Mar. 2005, The Internet Society, Reston, Virginia.

Bi et al., "A CGA based Source Address Authorization and Authentication (CSA) Mechanism for Fist IPv6 Layer-3 Hop," Network Working Group, Jul. 27, 2008, Cernet, China.

Aura, "Cryptographically Generated Addresses (CGA)," Internet Engineering Task Force (IETF) Network Working Group Request for Comments: 3972 (Mar. 2005).

State Intellectual Property Office of the People's Republic of China, International Search Report in International Patent Application No. PCT/CN2009/074578 (Jan. 28, 2010).

* cited by examiner

| Correction field (16 bits) |
|---|
| Sub-network prefix (8 bits) |
| Conflict count |
| Public key (with a variable length) |
| Extension field (optional, with a variable length) |

FIG. 3(a)

| Next header | Header length | Reversed |
|---|---|---|
| CGA parameter ||| 
| Signature information |||

METHOD AND DEVICE FOR PREVENTING NETWORK ATTACKS

CROSS-REFERENCE TO RELATED APPLICATIONS

This application is a continuation of International Application No. PCT/CN2009/074578, filed on Oct. 23, 2009, which claims priority to Chinese Patent Application No. 200810174681.8, filed on Oct. 31, 2008, both of which are hereby incorporated by reference in their entireties.

FIELD OF THE INVENTION

The present invention relates to the field of a network information security technology, and in particular, to a method and a device for preventing network attacks.

BACKGROUND OF THE INVENTION

A Denial of Service (DoS) attack is a malicious attack that causes great harm to a network, in which a host usually attacks a target. A Distributed Denial of Service (DDoS) attack is an attack in which many hosts in a network are controlled to collectively attack a server.

Typical forms of the DoS attack include Packet Internet Grope, ping of death, a teardrop attack, a User Datagram Protocol (UDP) flooding attack, a synchronization (SYN) attack, a land attack, and an Internet Protocol (IP) counterfeiting DoS.

A typical form of the DDoS attack using the Transfer Control Protocol (TCP) is as follows.

The TCP is a connection-oriented protocol, and two communication parties in the network are required to establish a connection before using the protocol for communication. The establishment of the connection includes three steps.

In step 1, when the connection is being established, a client sends an SYN packet indicating a port of a server to which the client is to be connected and an initial sequence number x.

In step 2, a server returns an SYN packet including an initial sequence number y of the server as a response, and at the same time sets an acknowledgment sequence number ACK as (x+1) to acknowledge the SYN packet of the client. An SYN occupies a sequence number.

In step 3, the client acknowledges the SYN packet of the server by setting the acknowledgment sequence number ACK as (y+1). The three packets complete the establishment of the TCP connection.

The process is also called a "3-step handshake" process.

The DoS attack is an attack aiming at the "3-step handshake" process of the TCP connection. After the server end sends the connection response packet in step 2, the client maliciously does not send the third acknowledgement packet, so the server end keeps waiting for the third acknowledgment message, and sends the second response packet to the client repeatedly, thus occupying a lot of server resources and eventually resulting in that the server cannot provide normal services for other clients.

In the conventional art, a method for preventing the DDoS attack is as follows.

In the method, a router is appropriately configured to prevent the DDoS attack, and the method includes: using an extended access list, unicast reverse path forwarding, TCP intercepting, and content-based access control.

A content-based access control technology is a method for preventing the DoS attack, where TCP and UDP data packets are filtered intelligently according to application layer session information. The method determines duration of a session and when to delete a semi-connection by setting a timeout threshold value and a session threshold value. The method prevents the flooding attack just by monitoring the number of semi-connections and a frequency of the semi-connections. Whenever an abnormal semi-connection is established, or a large number of semi-connections emerge in a short period of time, a user can judge that the flooding attack occurs.

The content-based access periodically (for example, every minute) detects the number of existing semi-connections and a frequency of attempts to establish a connection. When the number of the existing semi-connections exceeds a threshold value, a router deletes some semi-connections to meet demands of establishing new connections, and the router continuously deletes the semi-connections until the number of the existing semi-connections is smaller than another threshold value. Similarly, when the frequency of the attempts to establish a connection exceeds a threshold value, the router takes the same measures to delete a part of connection requests until the number of the connection requests is smaller than another threshold value. By continuously monitoring and deleting, the SYN flooding attack can be effectively prevented. However, the method of setting the threshold values of the semi-connections has certain errors, and cannot precisely judge the semi-connections in the connection of the DDos attack from possible semi-connections during a normal connection.

SUMMARY OF THE INVENTION

Embodiments of the present invention provide a method and a device for preventing network attacks, which can improve network security.

An embodiment of the present invention provides a method for preventing network attacks, where the method includes:

obtaining a data packet, where a source address of the data packet is a cryptographically generated address (CGA);

detecting the obtained data packet, and judging whether the data packet includes a CGA parameter and signature information;

authenticating the CGA parameter if the data packet includes the CGA parameter and the signature information, and authenticating the signature information according to the successfully-authenticated CGA parameter; and sending the data packet to a destination address after the signature information is authenticated successfully.

An embodiment of the present invention provides a method for preventing network attacks, where the method includes:

generating a CGA parameter and signature information according to a source address and a public key; and attaching the source address of the data packet, the CGA parameter, and the signature information to the data packet, and sending the data packet, where the source address is the CGA generated according to the public key.

An embodiment of the present invention provides a device for preventing network attacks, where the device includes:

a data packet receiving module, configured to obtain a data packet, where a source address of the data packet is a CGA;

a data packet check module, configured to check the received data packet, judge whether the data packet includes a CGA parameter and signature information, and send a first check result;

a CGA authentication module, configured to authenticate the CGA parameter of the obtained data packet when the first check result indicates that the CGA parameter exists, and send a authentication result of the CGA parameter;

a signature authentication module, configured to authenticate the signature information according to the successfully-authenticated CGA parameter if the authentication result sent by the CGA authentication module indicates that the CGA parameter is authenticated successfully, and send a authentication result of the signature information; and a main control module, configured to process the data packet sent to a server according to the received first check result and the authentication result, sent by the CGA authentication module, of the CGA parameter or the authentication result, sent by the signature authentication module, of signature information.

If the authentication of the CGA of the obtained data packet performed by the CGA authentication module succeeds, and the authentication performed by the signature authentication module succeeds, the main control module sends the data packet to a destination address.

An embodiment of the present invention provides a device for preventing network attacks, where the device includes:

a parameter generating module, configured to generate a CGA parameter and signature information according to a source address and a public key;

a parameter attachment module, configured to attach the source address, the CGA parameter, and the signature information to a data packet, where the source address is a CGA generated according to the public key; and a data packet sending module, configured to send the data packet.

With the technical solutions according to the embodiment of the present invention, a CGA parameter and signature information are attached to a data packet, and when a data packet is received, it is checked whether the data packet includes a CGA parameter and signature information. Authentication is performed on the CGA parameter and the signature information. If both the CGA parameter and the signature are authenticated successfully, the successfully-authenticated data packet is sent to a destination address. The CGA parameter used by the data packet is directly used to ensure authenticity of the source address of the data packet, thus preventing the network attacks performed by counterfeiting the address. In addition, by authenticating the signature information, authenticity of identification of a sender of the data packet and bound address of the sender of the data packet are further ensured. Therefore, illegal data packets are filtered to prevent network attacks on servers, thus improving network security.

BRIEF DESCRIPTION OF THE DRAWINGS

To illustrate the technical solutions according to the embodiments of the present invention more clearly, the accompanying drawings for describing the embodiments are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

The technical solution of the present invention will be clearly described in the following with reference to the accompanying drawings. It is obvious that the embodiments to be described are only a part rather than all of the embodiments of the present invention. All other embodiments obtained by persons skilled in the art based on the embodiments of the present invention without creative efforts shall fall within the protection scope of the present invention.

As a next generation Internet protocol, the Internet Protocol Version 6 (IPv6) will be more and more widely used. Compared with the existing IP, that is, the Internet Protocol Version 4 (IPv4), the IPv6 has the following characteristics: extended addressability, a simplified header format, improvement of support for an extended header and options, stream identification capability, and authentication and encryption capability.

Embodiment 1

Figure 1:
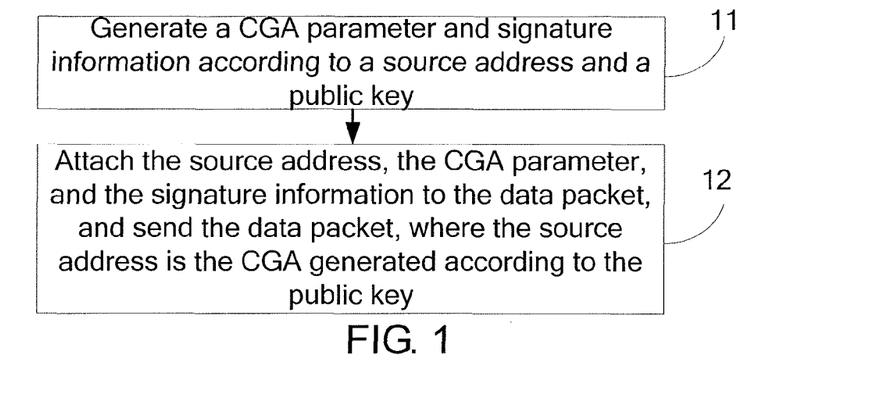
FIG. 1 is a flow chart of a method for preventing network attacks according to Embodiment 1 of the present invention.

As shown in FIG. 1(a), an embodiment of the present invention provides a method for preventing network attacks, and in terms of a sender of a data packet, the method specifically includes the following steps.

In step 11, a CGA parameter and signature information are generated according to a source address and a public key.

In an IPv6 network, network address planning is more reasonable, network addresses in the same sub-network have the same network prefix, and through the network prefix of a network address, it can be judged whether the address belongs to the sub-network. An IPv6 address has 128 bits, the first 64 bits are a sub-network prefix, and the last 64 bits are an interface identifier. In the embodiment of the present invention, it is assumed that all data packets are sent by clients, when a client joins in a network, a network system allocates a public key to the client, and in this case the sub-network prefix is also fixed. The client calculates a unidirectional hash function by using the public key and some attached parameters, to generate an interface identifier. The generated interface identifier and the sub-network prefix form a CGA, and the generated CGA is used as an IP address of the client. Specifically, the interface identifier is generated according to an algorithm defined in the RFC3972.

Figure 3A:
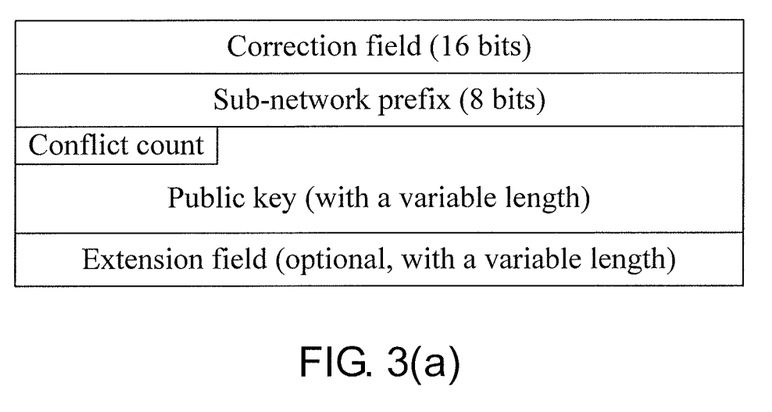
FIG. 3(a) is a schematic view of a data structure of a CGA parameter according to an embodiment of the present invention.

A data structure of a CGA parameter is as shown in FIG. 3(a), which includes a correction field, a sub-network prefix, a public key, and an extension field, and may further include a collision count. The generation of the CGA parameter according to the source address specifically includes: respectively inserting the sub-network prefix, the public key, and the collision count into a fixed data structure to generate the CGA parameter.

The generating the signature information according to the source address specifically includes: encrypting a payload of the data packet by using a private key to obtain the signature information. The private key corresponds to the public key for generating the CGA.

In step 12, the source address, the CGA parameter, and the signature information are attached to the data packet, and the data packet is sent. The source address is the CGA generated according to the public key.

Figure 3B:
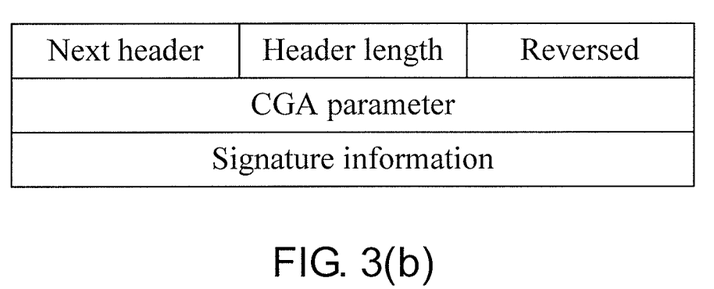
FIG. 3(b) is a schematic view of a data structure of a CGA extension header according to an embodiment of the present invention.

An IPv6 data packet includes a basic header, extension headers the number of which is variable, and a payload of the data packet The basic header includes the source address and a destination address, and indicates a next extension header. A structure of the CGA extension header is as shown in FIG. 3 (b). The extension header also includes a field indicating a next header, and further includes defined options relevant to the extension header. The CGA extension header also includes the CGA parameter and the signature information.

In the embodiment of the present invention, the CGA parameter and the signature information are generated according to the source address and are attached to the data packet, so as to prove the reliability of the address of the sender of the data packet. The CGA parameter is generated according to the public key. The signature information is generated according to the private key corresponding to the public key. As the public key and the private key can have certain characteristics of identification and privacy, it is difficult for others to perform identification counterfeiting.

Embodiment 2

Figure 2:
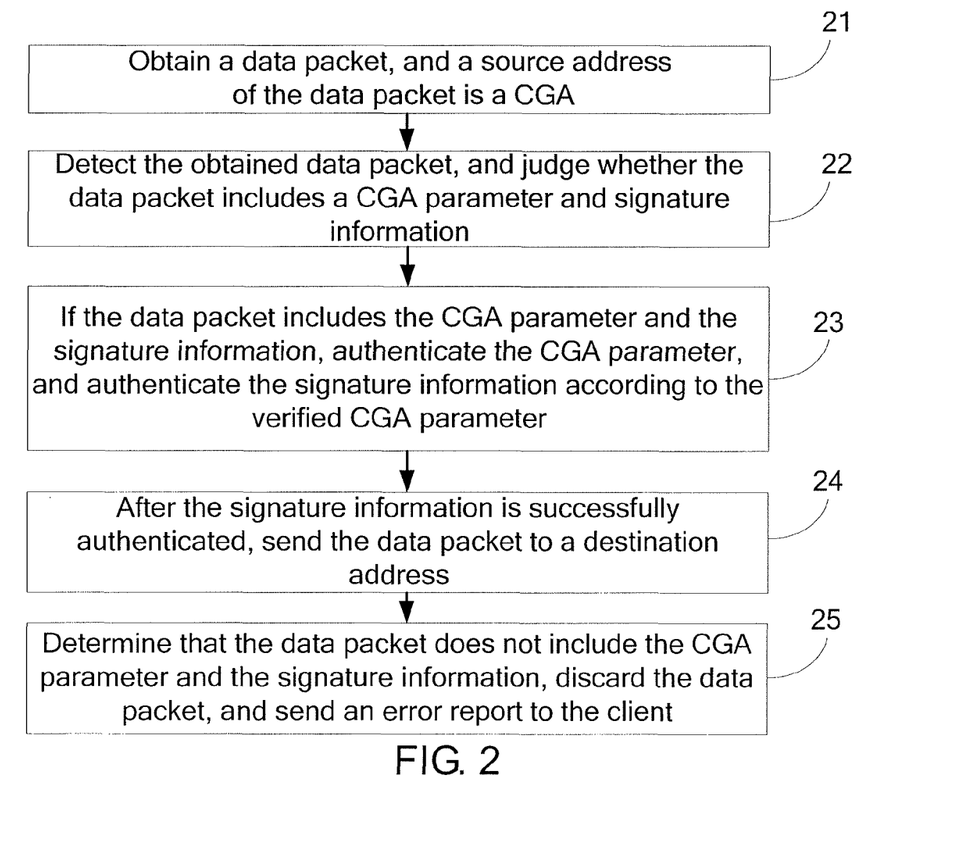
FIG. 2 is a flow chart of a method for preventing network attacks according to Embodiment 2 of the present invention.

As shown in FIG. 2, an embodiment of the present invention provides a method for preventing network attacks, and in terms of a receiving end of a data packet, the method specifically includes the following steps.

In step 21, a data packet is obtained, where a source address of the data packet is a CGA.

In step 22, the obtained data packet is detected, and it is judged whether the data packet includes a CGA parameter and signature information.

Specifically, it is determined whether a structure of a data packet CGA extension header includes the CGA parameter and the signature information. If the structure of the data packet CGA extension header does not include the CGA parameter or the signature information, or includes only one of: the CGA parameter and the signature information the data packet is discarded.

In step 23, if the data packet includes the CGA parameter and the signature information, the CGA parameter is authenticated, and the signature information is authenticated according to the successfully-authenticated CGA parameter.

Specifically, in this embodiment, the authentication of the CGA parameter of the data packet includes the followings steps.

Hash calculation is performed on a public key in the CGA parameter again to obtain a hash value, and the hash value is compared with an interface identifier in the source address. If the hash value is not consistent with the interface identifier, the CGA authentication fails.

Or, it is checked whether a sub-network prefix in a data structure of the CGA parameter is a sub-network prefix of the CGA. If a sub-network prefix in a data structure of the CGA parameter is not a sub-network prefix of the CGA, the authentication of CGA fails.

Or, it is checked whether a collision count in the data structure of the CGA parameter is within a preset range. If a collision count in the data structure of the CGA parameter is not within a preset range, the CGA authentication fails.

Specifically, in this embodiment, the authentication of the signature information according to the successfully-authenticated CGA parameter includes the following steps.

The public key in the successfully-authenticated CGA parameter is extracted. An encryption algorithm corresponding to the signature is used to perform calculation on the signature by using the public key, and a value obtained through calculation is compared with a value before the signature calculation. If the two values are the same, the signature is authenticated successfully.

In step 24, after the signature information is authenticated successfully, the data packet is sent to a destination address.

If the signature is authenticated, it means that the source address of the data packet is correct without counterfeiting, and the data packet may be determined to be secure.

If the CGA parameter and the signature information do not pass the authentication, it means that the source address of the data packet may be counterfeit, the data packet may be sent by an attacker by using a puppet machine, and the data packet is malicious, so the data packet is discarded, and an error report is sent to a client.

In step 25, it is determined that the data packet does not include the CGA parameter or the signature information, the data packet is discarded, and an error report is sent to the client.

If the data packet includes the CGA parameter and the signature information, or only includes the signature information, DDoS attack defense equipment queries a record table of source IP addresses and corresponding public keys, where the record table is maintained in the DDoS attack defense equipment, and judges whether the source address of the data packet is included in the table. If the table includes the source address, the signature information is authenticated according to a corresponding public key in the table.

In the embodiment of the present invention, the CGA parameter used by the data packet can directly be used to ensure authenticity of the source address of the data packet, thus preventing the network attacks performed by counterfeiting the address. In addition, by authenticating the signature information, authenticity of the identification of the sender of the data packet and the bound address of the sender of the data packet are further ensured. Therefore, illegal IPv6 data packets are filtered out to prevent network attacks on servers, thus improving network security.

Embodiment 3

Figure 4:
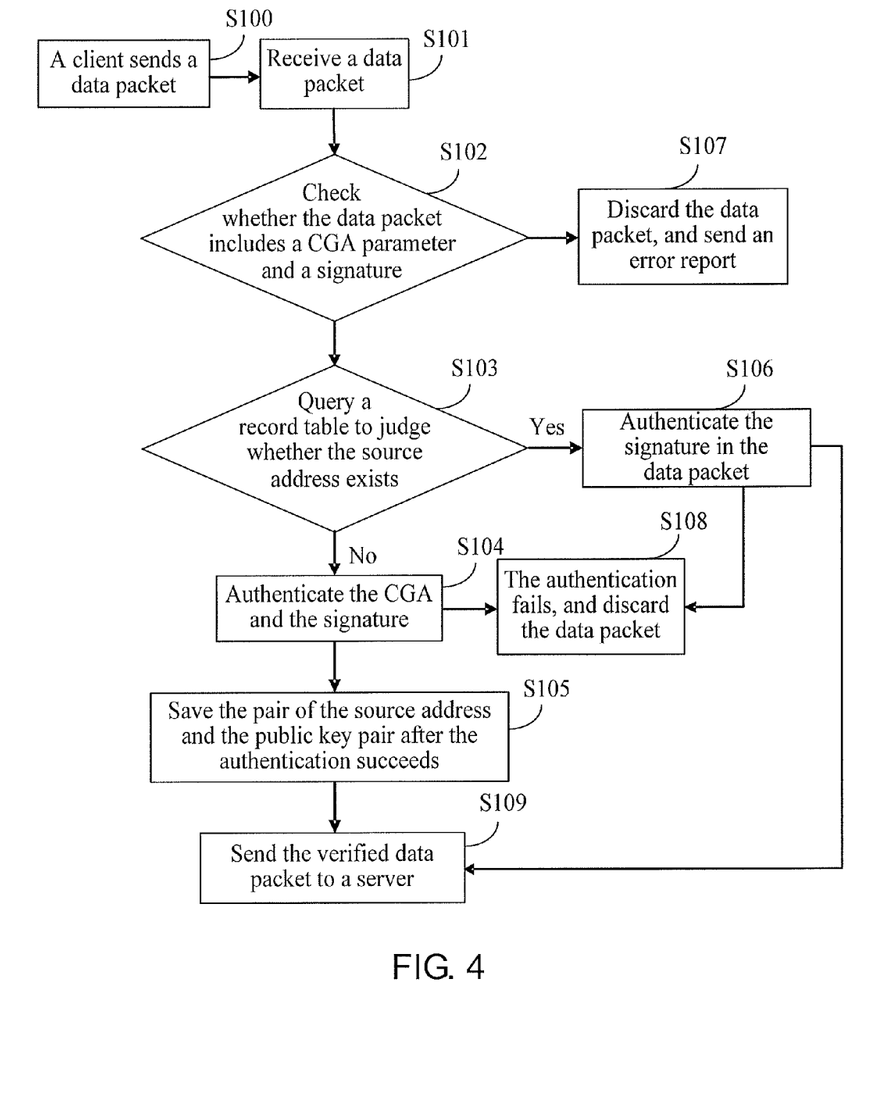
FIG. 4 is a flow chart of a method for preventing network attacks according to Embodiment 3 of the present invention.

In this embodiment, an example is taken for illustrating a method for preventing network attacks in detail in terms of a receiving end of a data packet, and in the example, a network attack is a DDoS attack, and a server is an object to be protected by network attack defense equipment. Referring to FIG. 4, in this embodiment, the method for preventing the network attacks specifically includes the following steps.

In step S100, a client sends a data packet to a server, and a source address of the data packet is an IPv6 address generated by a CGA.

In step S100, a session is established between the client and the server.

In step S101, network attack defense equipment receives the data packet.

In step S102, it is checked whether the IP data packet includes a CGA parameter and a signature. If only a signature information option is included, or both options of the CGA parameter and the signature information are included, the process proceeds to step 103; if only the CGA parameter option is included, or neither the CGA parameter nor the signature information is included, the process proceeds to step 107.

The signature information is obtained by the client by encrypting a payload of the data packet by using a private key corresponding to a public key for generating the source address.

In step S103, a record table is queried to judge whether the queried table includes the source address.

The record table is established in advance, and the record table saves successfully-authenticated source addresses and corresponding public keys, for being queried in subsequent authentication.

The source address of the received data packet is extracted, and it is queried whether the source address is saved in the record table.

In step S104, if the record table does not include a record of the source address, the CGA parameter is authenticated first, and the signature information is authenticated according to the successfully-authenticated CGA parameter.

Specifically, in this embodiment, the authentication of the CGA parameter includes the followings steps.

It is checked whether a sub-network prefix in a data structure of the CGA parameter is a sub-network prefix of the CGA. If a sub-network prefix in a data structure of the CGA parameter is not a sub-network prefix of the CGA, the CGA authentication fails.

It is checked whether a collision count in the data structure of the CGA parameter is within a preset range. If a collision count in the data structure of the CGA parameter is not within a preset range, the CGA authentication fails.

Specifically, in this embodiment, the authentication of the signature information includes the followings steps.

The public key in the successfully-authenticated CGA parameter is extracted. An encryption algorithm corresponding to the signature is used to perform calculation on the signature by using the public key, and a value obtained through calculation is compared with a value before the signature calculation. If the two values are the same, the signature is authenticated successfully.

In step S105, after the authentications succeed, the source address and the corresponding public key are saved in the record table, and the data packet is forwarded to the server.

The source address does not exist in the record table, and both the CGA parameter and the signature information are authenticated successfully, which means that it is the first time that the client sends a data packet to the server.

In step S106, if the record table already records the source address, the signature information is authenticated by using a corresponding public key in the record table.

As all source addresses saved in the record table have pass the CGA authentication successfully, the CGA authentication is not required to be performed on the source addresses again.

Specifically, in this embodiment, the authentication of the signature information includes the followings steps.

The public key in the successfully-authenticated CGA parameter is extracted. An encryption algorithm corresponding to the signature is used to perform calculation on the signature by using the public key, and a value obtained through calculation is compared with a value before the signature calculation. If the two values are the same, the signature is authenticated successfully.

In step S107, if the data packet does not include a CGA parameter option or the signature information, or only includes the CGA parameter option, the network attack defense equipment discards the data packet, and returns an error report to the client.

In step S108, if one of the CGA parameter authentication and the signature authentication fails, the data packet is discarded.

In step S109, the authentications succeed. The network attack defense equipment sends the successfully-authenticated data packet to the server.

After the session ends, the network attack defense equipment removes the record of the source address of the client and the corresponding public key from the record table.

In the embodiment of the present invention, the CGA parameter used by the client can be directly used to ensure authenticity of the address of the client, thus preventing the DDoS attacks performed by counterfeiting the address. In addition, by authenticating a signature of a message sent by the client, authenticity of the identification of the client and the bound address of the client are further ensured. Therefore, illegal IPv6 data packets are filtered out to prevent DDoS attacks on the servers, thus improving network security.

Embodiment 4

Figure 5:
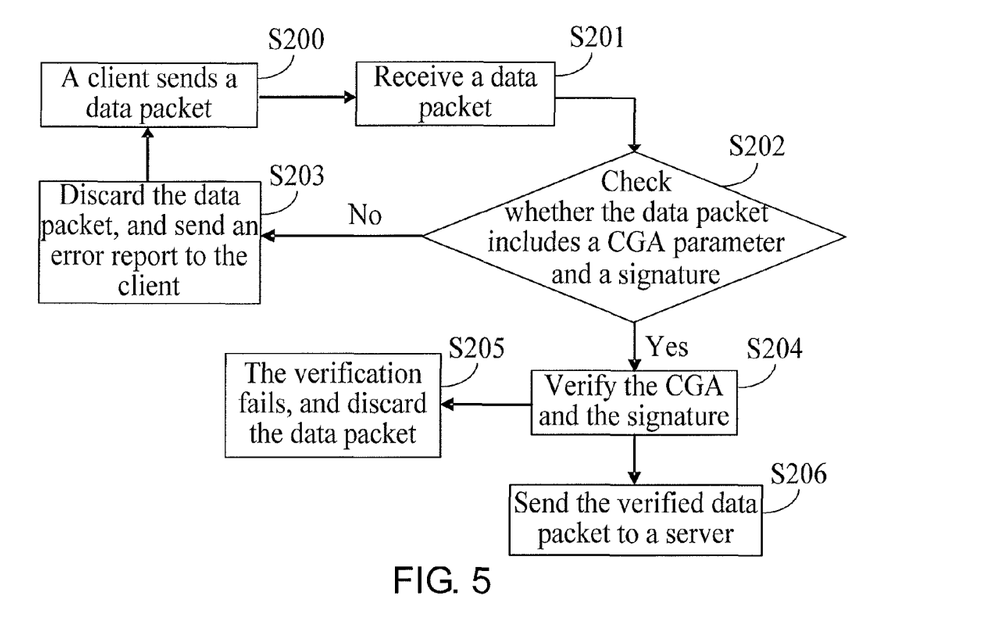
FIG. 5 is a flow chart of a method for preventing network attacks according to Embodiment 4 of the present invention.

Referring to FIG. 5, in this embodiment, a method for preventing network attacks is provided. An example is taken for illustrating the method for preventing the network attacks in detail, and in the example, a network attack is a DDoS attack, and a server is an object to be protected by network attack defense equipment.

In step S200, a client sends a data packet to a server, where a source address of the data packet is an IPv6 address generated by a CGA.

In step S201, network attack defense equipment receives the data packet.

In step S202, the network attack defense equipment checks whether the data packet includes a CGA parameter and a signature.

In step S203, if the data packet does not include the CGA parameter or the signature, the data packet is discarded. The network attack defense equipment sends an error report to the source end to notify the client to send a data packet that includes a CGA parameter and a signature.

In step S204, if the data packet includes the CGA parameter and the signature, the CGA parameter is authenticated first, and the signature information is authenticated according to the successfully-authenticated CGA parameter.

In step S205, if one of the CGA parameter authentication and the signature authentication fails, the data packet is discarded.

In step S206, if both the CGA parameter authentication and the signature authentication succeed, the network attack defense equipment sends the data packet to the server.

Differences between Embodiment 4 and Embodiment 3 are as follows. In Embodiment 3, the network attack defense equipment is required to maintain a record table of successfully-authenticated source addresses and corresponding public keys. During a session between the client and the server, the CGA parameter is required to be authenticated only in communication of a first initialized session, and before the session ends, only the signature information is required to be authenticated. However, in Embodiment 4, the network attack defense equipment is required to authenticate the CGA parameter and the signature information of each data packet sent by the client. Obviously, compared with Embodiment 4, in Embodiment 3 the overhead of repeated authentication of the CGA parameter is avoided, but in Embodiment 3 a record table is required to be created, maintained, and destroyed, and the record table is required to be queried.

In the technical solution according to this embodiment, it is checked and judged whether the IP data packet includes the CGA parameter and the signature information. The CGA parameter and the signature information are authenticated. If both the CGA parameter and the signature are authenticated successfully, the successfully-authenticated data packet is sent to the server. In this way, legality of the sender of the data packet is confirmed, and the illegal IPv6 data packet is filtered out, thus preventing the DDoS attack on the server, and improving network security.

Embodiment 5

Figure 6:
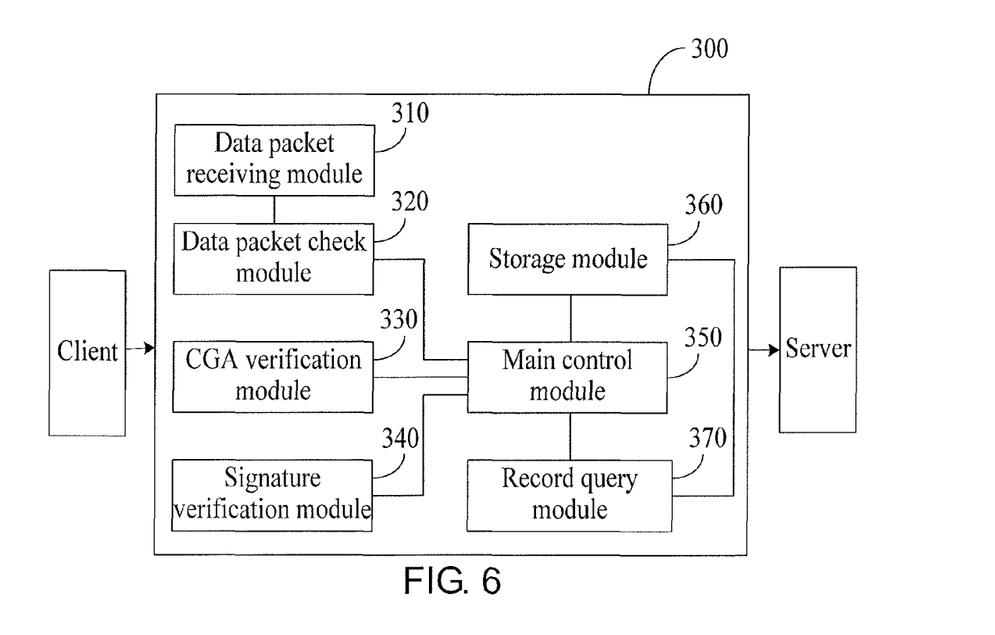
FIG. 6 is a schematic structural view of a device for preventing network attacks according to Embodiment 5 of the present invention.

Referring to FIG. 5, in the embodiment of the present invention, a device for preventing network attacks 300 is provided, where the device includes a data packet receiving module 310, a data packet check module 320, a CGA authentication module 330, a signature authentication module 340, and a main control module 350.

The data packet receiving module 310 is configured to obtain a data packet, where a source address of the data packet is a CGA.

The data packet check module 320 is configured to check the received data packet, determine whether the data packet includes a CGA parameter and signature information, generate a first check result, and send the first check result to the CGA authentication module 330 and the main control module 350.

The CGA parameter includes a correction field, a sub-network prefix, a public key, a collision count, and an extension field.

The signature information is obtained by a sender by encrypting a payload of the data packet by using a private key corresponding to a public key for generating the source address.

The CGA authentication module 330 is configured to authenticate the CGA parameter of the obtained data packet, and send an authentication result to the signature authentication module 340 and the main control module 350.

The signature authentication module 340 is configured to authenticate the signature information of the data packet by using the public key of the CGA parameter, and return an authentication result to the main control module 350.

The main control module 350 is configured to process the data packet according to the received first check result sent by the data packet check module 320, and the authentication result of the CGA authentication module 330 or the signature authentication module 340.

If the data packet check module 320 judges that the data packet does not include the signature information, the main control module 350 discards the data packet.

If the authentication on the CGA parameter performed by the CGA authentication module 330 fails, or the authentication on the signature information performed by the signature authentication module 340 fails, the main control module 350 discards the data packet.

If the authentication of the CGA parameter of the obtained data packet performed by the CGA authentication module 330 succeeds, and the authentication performed by the signature authentication module 340 succeeds, the main control module 350 sends the data packet to a destination address.

The device 300 for preventing the network attacks further includes a storage module 360 and a record query module 370.

The storage module 360 is configured to store a record table. The record table includes the source address of the data packet, which has passed the authentication performed by the CGA authentication module, and the public key corresponding to the source address.

The record query module 370 is configured to query the record table in the storage module according to the source address of the received IP data packet, and return a generated second check result to the main control module.

If the record query module 370 determines that the source address exists in the record table by querying, the signature authentication module authenticates the signature by using a public key in the record table. If the signature passes the authentication, the data packet is sent to a server; and otherwise, the data packet is discarded.

If the received second check result indicates that the record table does not include the source address of the data packet, the CGA parameter of the data packet is sent to the CGA authentication module for authentication, and the signature information of the data packet is sent to the signature authentication module for authentication. The CGA parameter and signature information that have pass the authentications are saved in the record table.

In this embodiment, in the device for preventing network attacks, it is checked and judged whether the data packet includes the CGA parameter and the signature information. The CGA parameter and the signature are authenticated. If both the CGA parameter authentication and the signature authentication succeed, the device for preventing network attacks sends the data packet that passes the authentication to target network equipment, thus filtering out illegal IPv6 data packets, preventing network attacks on the target network equipment, and improving network security.

Embodiment 6

Figure 7:
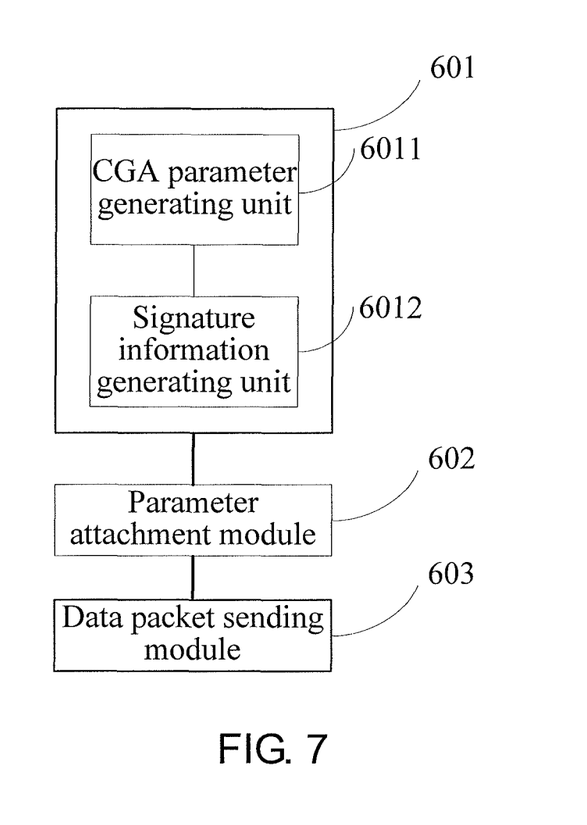
FIG. 7 is a schematic structural view of a device for preventing network attacks according to Embodiment 6 of the present invention.

Referring to FIG. 7, in an embodiment of the present invention, a device for preventing network attacks is provided, where the device includes a parameter generating module 601, a parameter attachment module 602, and a data packet sending module 603.

The parameter generating module 601 is configured to generate a CGA parameter and signature information according to a source address and a public key. The source address is a CGA generated according to the public key. The source address is usually an IPv6 address. The public key is automatically provided by a network when the device for preventing network attacks according to this embodiment enters the network.

Specifically, the parameter generating module includes a CGA parameter generating unit 6011 and a signature information generating unit 6012.

The CGA parameter generating unit 6011 is configured to insert a sub-network prefix of the source address, the public key, and a collision count into a fixed data structure respectively to generate the CGA parameter.

The signature information generating unit 6012 is configured to encrypt a payload of the data packet by using a private key to obtain the signature information. The private key corresponds to the public key for generating the CGA.

The parameter attachment module 602 is configured to attach the source address, the CGA parameter, and the signature information to the data packet. The IPv6 data packet includes a basic header, extension headers whose number is variable, and a payload of the data packet. The basic header includes the source address and a destination address, and indicates a next extension header. A structure of the CGA extension header is as shown in FIG. 3 (b). The extension header also includes a field indicating a next header, and further includes defined options relevant to the extension header. The CGA extension header also includes the CGA parameter and the signature information.

The data packet sending module 603 is configured to send the data packet. Specifically, the data packet sending module 603 sends the data packet including the basic header, the extension header, and the payload.

In the embodiment of the present invention, the CGA parameter and the signature information are generated according to the source address, and are attached to the data packet, so as to prove reliability of the address of the sender of the data packet. The CGA parameter is generated according to the public key. The signature information is generated according to the private key corresponding to the public key. As the public key and the private key have certain characteristics of identification and privacy, it is difficult for others to perform identification counterfeiting.

Obviously, it should be understood by persons skilled in the art that, all of the units or steps of the present invention may be implemented by a universal computing device. The units or steps may be integrated in a single computing device, or be distributed in a network formed by multiple computing devices. Optionally, the units or steps may be implemented by program codes that can be run by the computing device, and therefore the program codes may be stored in a storage device to be run by the computing device. Alternatively, the units or steps are made into integrated circuit modules, or some of the units or steps are made into a single integrated circuit module to be implemented. Thus, the present invention is not limited by any specific combination of hardware and software.

The above descriptions are merely some exemplary embodiments of the present invention, but are not intended to limit the present invention. Any modification, equivalent replacement, or improvement made without departing from the spirit and principle of the present invention should fall within the scope of the present invention.

What is claimed is:

1. A method performed by a network entity for preventing network attacks, comprising:
   receiving a data packet including a source address of the data packet, wherein the source address is a cryptographically generated address (CGA);
   detecting the received data packet, and determining whether the data packet comprises a CGA parameter and signature information;
   authenticating the CGA parameter when the data packet comprises the CGA parameter and the signature information, and authenticating the signature information according to a successfully-authenticated CGA parameter; wherein the authenticating the signature information according to the successfully-authenticated CGA parameter comprises:
   querying a record table to determine whether the source address of the data packet is contained in the record table;
   authenticating the CGA parameter when the source address is not contained in the record table, authenticating the signature information according to the successfully-authenticated CGA parameter, and saving the source address and a corresponding public key in the record table, wherein the corresponding public key is extracted from the successfully-authenticated CGA parameter; and
   discarding the data packet when
      the CGA parameter authentication fails, or
      the signature information authentication fails; and
   authenticating the signature information by using the corresponding public key when the source address is contained in the record table, wherein the corresponding public key is contained in the record table and corresponds to the source address; and
   discarding the data packet when
      CGA parameter authentication fails, or
      the information authentication fails; and
   sending the data packet to a destination address after the signature information is authenticated.

2. The method according to claim 1, wherein the CGA parameter comprises a public key, a sub-network prefix, and a collision count, and the authenticating the CGA parameter comprises performing at least one authentication step of the group consisting of:
   performing a hash calculation on the public key in the CGA parameter to obtain a hash value, and comparing the hash value with an interface identifier in the source address, wherein when the hash value is not consistent with the interface identifier, the CGA authentication fails; checking whether the sub-network prefix in the CGA parameter is the sub-network prefix of the CGA, wherein when the sub-network prefix in the CGA parameter is not the sub-network prefix of the CGA, the CGA authentication fails; and
   checking whether the collision count in the CGA parameter is within a preset range, wherein when the collision count in the CGA parameter is not within the preset range, the CGA authentication fails.

3. The method according to claim 1, wherein the CGA parameter comprises the public key, and the authenticating the signature information according to a successfully-authenticated CGA parameter comprises:
   performing a calculation on the signature information using an encryption algorithm corresponding to the signature information using a public key extracted from the successfully-authenticated CGA, and comparing a value obtained through the calculation on the signature information with a value before the signature information calculation, wherein successful authentication of the signature information occurs when the two values are the same.

4. The method according to claim 1, further comprising:
   returning an error report to the source address that sends the data packet after discarding the data packet.

5. A device for preventing network attacks, the device comprising:
   a processor; and
      a memory which comprises a data packet receiving module, a data packet check module, a cryptographically generated address (CGA) authentication module, a signature authentication module, a main control module, a storage module and a record query module, wherein:
      the data packet receiving module receives a data packet including a source address of the data packet, wherein the source address of the data packet is the CGA;
      the data packet check module, configured to checks the received data packet, determine whether the data packet comprises a CGA parameter and signature information, and send a first check result;
      the CGA authentication module authenticates the CGA parameter of the obtained data packet when the first check result indicates that the CGA parameter exists, and send an authentication result of the CGA parameter;

the signature authentication module authenticates the signature information according to a successfully-authenticated CGA parameter if the authentication result sent by the CGA authentication module indicates that the CGA parameter is authenticated successfully, and send an authentication result of the signature information; and the main control module processes the data packet sent to a server according to the received first check result, and the authentication result of the CGA parameter, which is sent by the CGA authentication module; or the authentication result of the signature information, which is sent by the signature authentication module, wherein when an authentication on the CGA parameter of the received data packet performed by the CGA authentication module succeeds, and an authentication performed by the signature authentication module succeeds, then the main control module sends the data packet to a destination address;

the storage module stores a record table, wherein the record table comprises the source address of the data packet of which the CGA parameter is successfully-authenticated by the CGA authentication module, and a public key corresponding to the source address and extracted from the successfully-authenticated CGA parameter;

the record query module queries the record table in the storage module according to the source address of the data packet, and return a second check result to the main control module; wherein the main control module uses a corresponding public key in the record table to authenticate the signature information when the received second check result indicates that the source address of the data packet exists in the record table, wherein the corresponding public key is contained in the record table and corresponds to the source address; and the main control module discards the data packet when the CGA parameter authentication fails, or the signature information authentication fails, and when the received second check result indicates that the source address of the data packet is not contained in the record table, the CGA parameter of the data packet is sent to the CGA authentication module for an authentication, and the signature information of the data packet is sent to the signature authentication module for the authentication.

* * * * *